(12) United States Patent
Park

(10) Patent No.: US 7,360,631 B1
(45) Date of Patent: Apr. 22, 2008

(54) APPARATUS FOR OPERATING PARKING BRAKE

(75) Inventor: Byoung Sun Park, Gwangmyeong (KR)

(73) Assignee: Hyundai Motor Company, Seoul (KR)

( * ) Notice: Subject to any disclaimer, the term of this patent is extended or adjusted under 35 U.S.C. 154(b) by 66 days.

(21) Appl. No.: 11/648,727

(22) Filed: Dec. 29, 2006

(30) Foreign Application Priority Data

Dec. 7, 2006 (KR) .................. 10-2006-0124094

(51) Int. Cl.
*F16D 65/22* (2006.01)
(52) U.S. Cl. .................. 188/330; 188/332; 188/106 A
(58) Field of Classification Search ............... 188/78, 188/106 A, 79.54, 70 R, 326, 327, 333
See application file for complete search history.

(56) References Cited

U.S. PATENT DOCUMENTS

| | | | | |
|---|---|---|---|---|
| 1,984,348 A | * | 12/1934 | Brunt | 188/78 |
| 2,051,088 A | * | 8/1936 | Kittle et al. | 188/106 A |
| 3,498,419 A | * | 3/1970 | Belart | 188/327 |
| 3,709,334 A | * | 1/1973 | Kondo et al. | 188/79.54 |
| 4,018,312 A | * | 4/1977 | Muramoto et al. | 188/333 |
| 5,180,037 A | * | 1/1993 | Evans | 188/70 R |
| 5,529,149 A | * | 6/1996 | Johannesen et al. | 188/70 R |
| 5,590,747 A | * | 1/1997 | Mery et al. | 188/326 |
| 5,957,247 A | * | 9/1999 | Zylstra et al. | 188/78 |

* cited by examiner

*Primary Examiner*—Chris Schwartz
(74) *Attorney, Agent, or Firm*—Morgan Lewis & Bockius LLP

(57) ABSTRACT

An apparatus for operating a parking brake that can reduce an operation stroke. A connecting member has shoe insert grooves with brake shoes inserted into both sides thereof. A first operation lever has one end rotatably combined with one side face of the connecting member and contacts with one of the brake shoes. A second operation lever has one end combined with the other end of the first operation lever and the other end rotatably combined with the other side face of the connecting member and contacts with the other one of the brake shoes.

5 Claims, 5 Drawing Sheets

APPARATUS FOR OPERATING PARKING BRAKE

CROSS-REFERENCE TO RELATED APPLICATION

This application claims priority to and the benefit of Korean Patent Application No. 10-2006-0124094 filed in the Korean Intellectual Property Office on Dec. 7, 2006, the entire contents of which are incorporated herein by reference.

BACKGROUND OF THE INVENTION (a) Field of the Invention

The present invention relates to an apparatus for operating a parking brake. More particularly, the present invention relates to an apparatus for operating a parking brake that can reduce operation stroke needed for operation.

(b) Description of the Related Art

Generally, an apparatus for operating a parking brake is connected with a parking lever located in a vehicle by a brake cable. If the parking lever is operated, the apparatus for operating the parking brake pushes brake shoes to both sides so as to apply braking force to the vehicle by frictional force.

In a conventional apparatus for operating a parking brake a connecting member and an operation lever are mounted together for rotation around a pivot point. The connecting member is provided with shoe insert grooves, and a brake shoe 20 is inserted into the shoe insert grooves.

A brake cable is connected to one end of the operation lever to provide operative force. Operation of the parking brake thus depends at least in part on the length of stroke of the operation level. However, because of structural limitations it can be difficult to obtain the amount of stroke needed for optimal operation.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide an apparatus for operating a parking brake having advantages of reducing an operation stroke (i.e., a distance by which an operation lever is moved) without reducing a distance by which the apparatus for operating a parking brake moves a brake shoe.

An exemplary embodiment of the present invention provides an apparatus for operating a parking brake by pushing brake shoes of the parking brake, the apparatus including a connecting member with shoe insert grooves, the brake shoes being inserted into both sides thereof; a first operation lever having one end rotatably combined with the connecting member and contacting with one of the brake shoes; and a second operation lever having one end combined with the other end of the first operation lever and the other end rotatably combined with the connecting member and contacting with the other one of the brake shoes.

The other end of the first operation lever and the one end of the second operation lever can be respectively provided with gear teeth and engaged with each other. A brake cable can be connected with the first operation lever. A rotation radius of the first operation lever can be larger than a rotation radius of the second operation lever.

DETAILED DESCRIPTION OF THE EMBODIMENTS

Exemplary embodiments of the present invention will hereinafter be described in detail with reference to the accompanying drawings.

Figure 1:
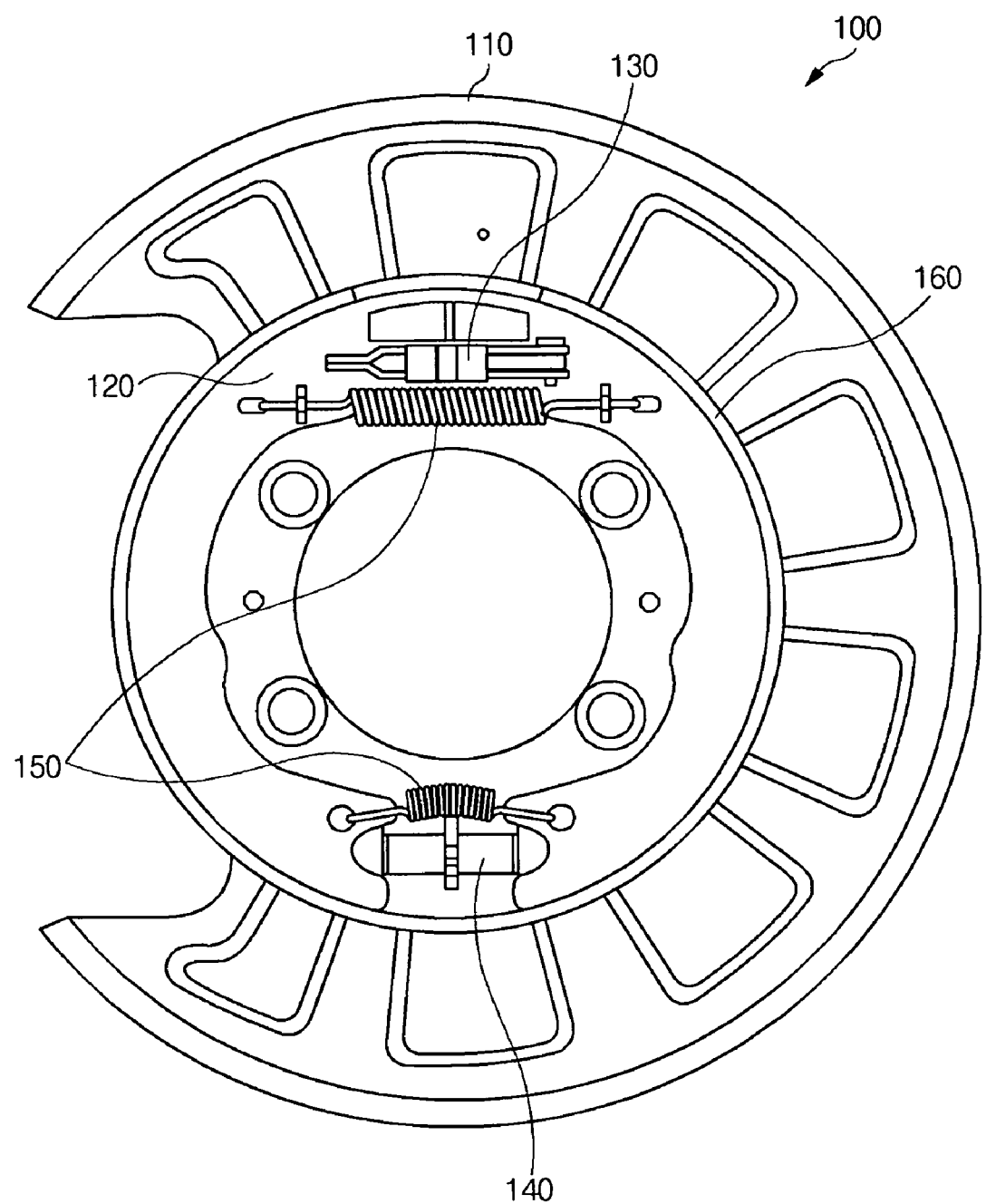
FIG. 1 is a front view of a parking brake provided with an apparatus for operating a parking brake according to an exemplary embodiment of the present invention.

Referring to FIG. 1, a parking brake 100 includes a base plate 110, a brake shoe 120, an operation apparatus 130, and a gap controller 140. A friction member 160 is attached to the base plate 110, and two brake shoes 120 are provided with a predetermined spacing with the friction member 160. One end of the each brake shoe 120 is inserted into each of both ends of the operation apparatus 130, and the other end is connected with the gap controller that controls gap between the brake shoe 120 and the friction member 160. In addition, both ends of the brake shoe 120 are connected each other by an elastic member 150.

The operation apparatus 130 is connected with a parking lever (not shown) provided in a vehicle by a brake cable. When a driver operated the parking lever, the operation apparatus 130 pushes the brake shoe 120 so as to contact with the friction member 160.

Figure 2:
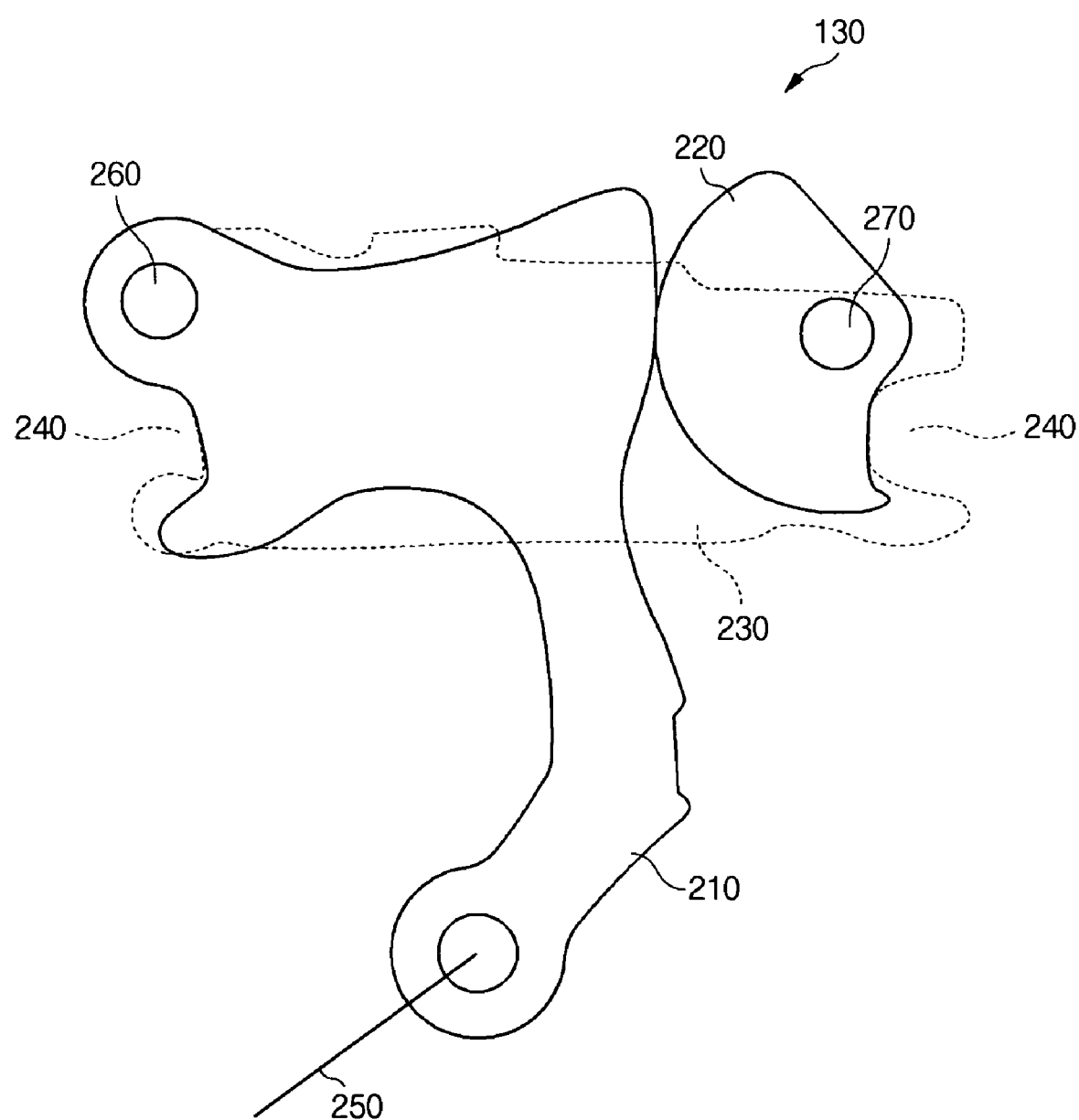
FIG. 2 is a schematic diagram of an apparatus for operating a parking brake according to an exemplary embodiment of the present invention.

Referring to FIG. 2, the operation apparatus 130 of a parking brake according to an exemplary embodiment of the present invention includes a connecting member 230, a first operation lever 210, and a second operation lever 220. The connecting member 230 has shoe insert grooves 240 at both sides thereof. The brake shoes 120 are inserted into the shoe insert grooves 240.

One end of the first operation lever 210 is combined with a side face of the connecting member 230 so that it can be rotated around a hinge axis 260, and the other end of the first operation lever 210 is provided with gear teeth. A partial portion of the bottom face of the first operation lever 210 is protruded, and a brake cable 250 is connected to the protruded portion. In addition, one face of the first operation lever 210 that is combined with the connecting member 230 by a hinge is contacted with one of the brake shoes 120.

One end of the second operation lever 220 is combined with the other end of the connecting member 230 so as to be rotatable around a hinge axis 270, and the other end of the second operation lever 220 is provided with gear teeth. Consequently, the gear teeth of the second operation lever 220 are engaged with the gear teeth of the first operation lever 210. In addition, one face of the second operation lever 220 that is combined with the connecting member 230 by a hinge is contacted with one of the brake shoes 120.

In order to reduce power for operating the operation apparatus 130, the rotation radius a of the first operation lever 210 to which brake cable 250 is connected can be larger than the rotation radius b of the second operation lever 220.

Figure 3:
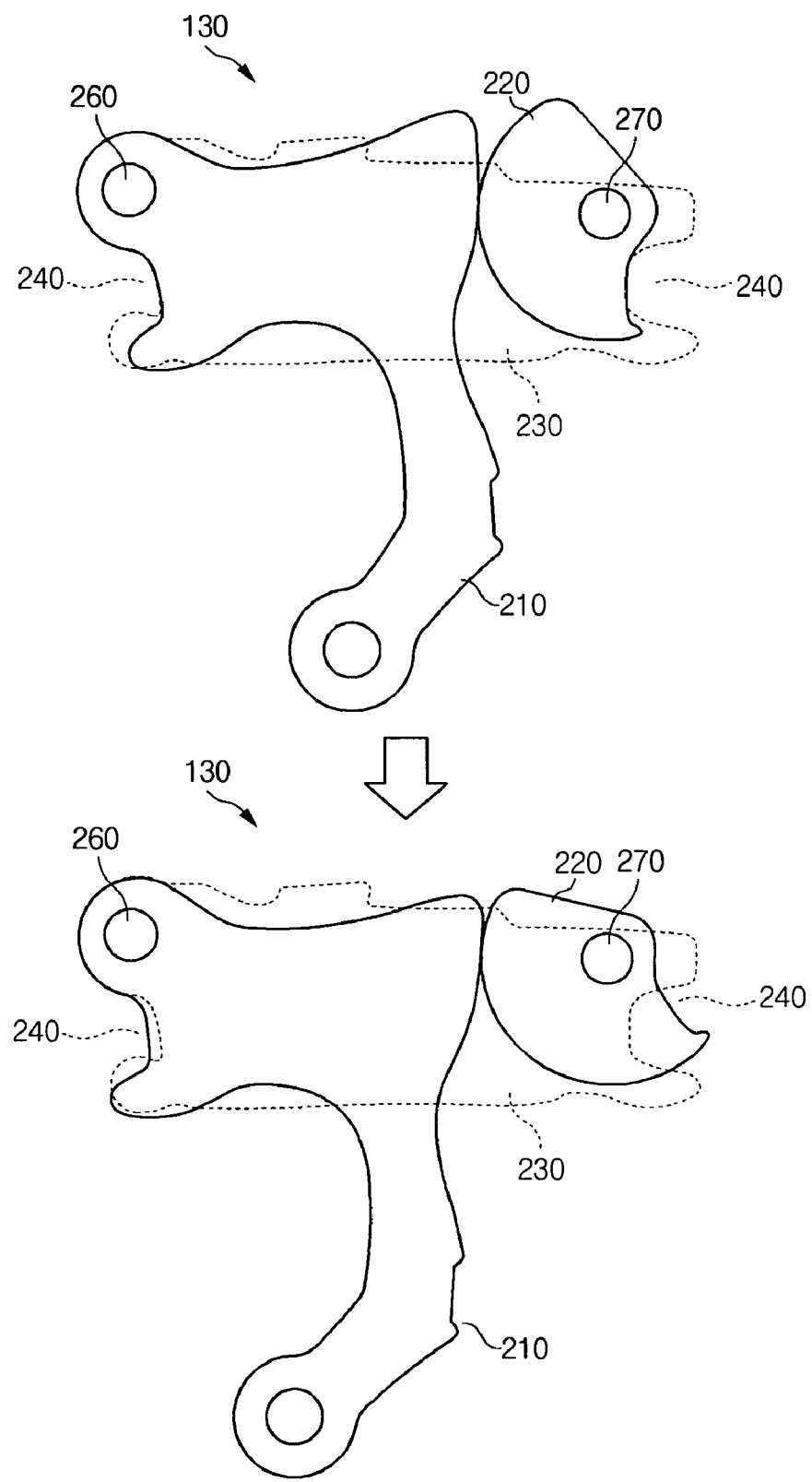
FIG. 3 is a schematic diagram for showing an operation status of an apparatus for operating a parking brake according to an exemplary embodiment of the present invention.

As shown in FIG. 3, if the brake cable 250 moves the first operation lever 210 to a left direction in the drawing, the first operation lever 210 is rotated clockwisely around the hinge axis 260 and pushes the brake shoe 120 contacted with the first operation lever 210 to a left direction in the drawing. Furthermore, the second operation lever 220 engaged with the first operation lever 210 by the gear is rotated counterclockwisely and pushes the brake shoe 120 contacted with the second operation lever 220 to a right direction in the drawing.

Figure 4:
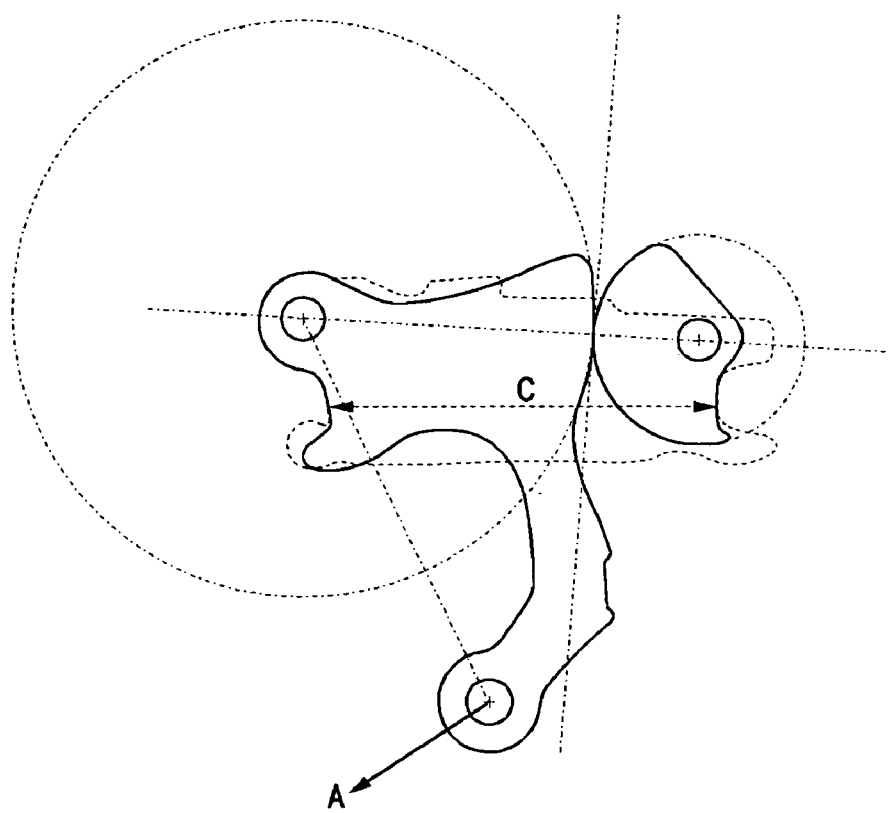
FIG. 4 is an analysis diagram of an apparatus for operating a parking brake according to an exemplary embodiment of the present invention.
Figure 4:
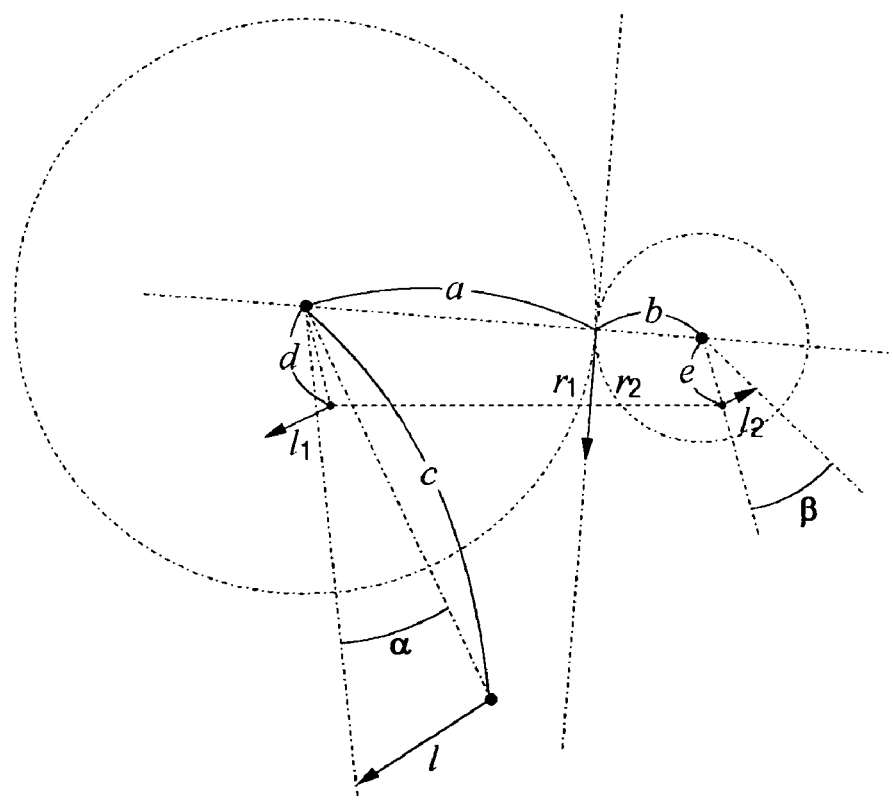
Figure 5:
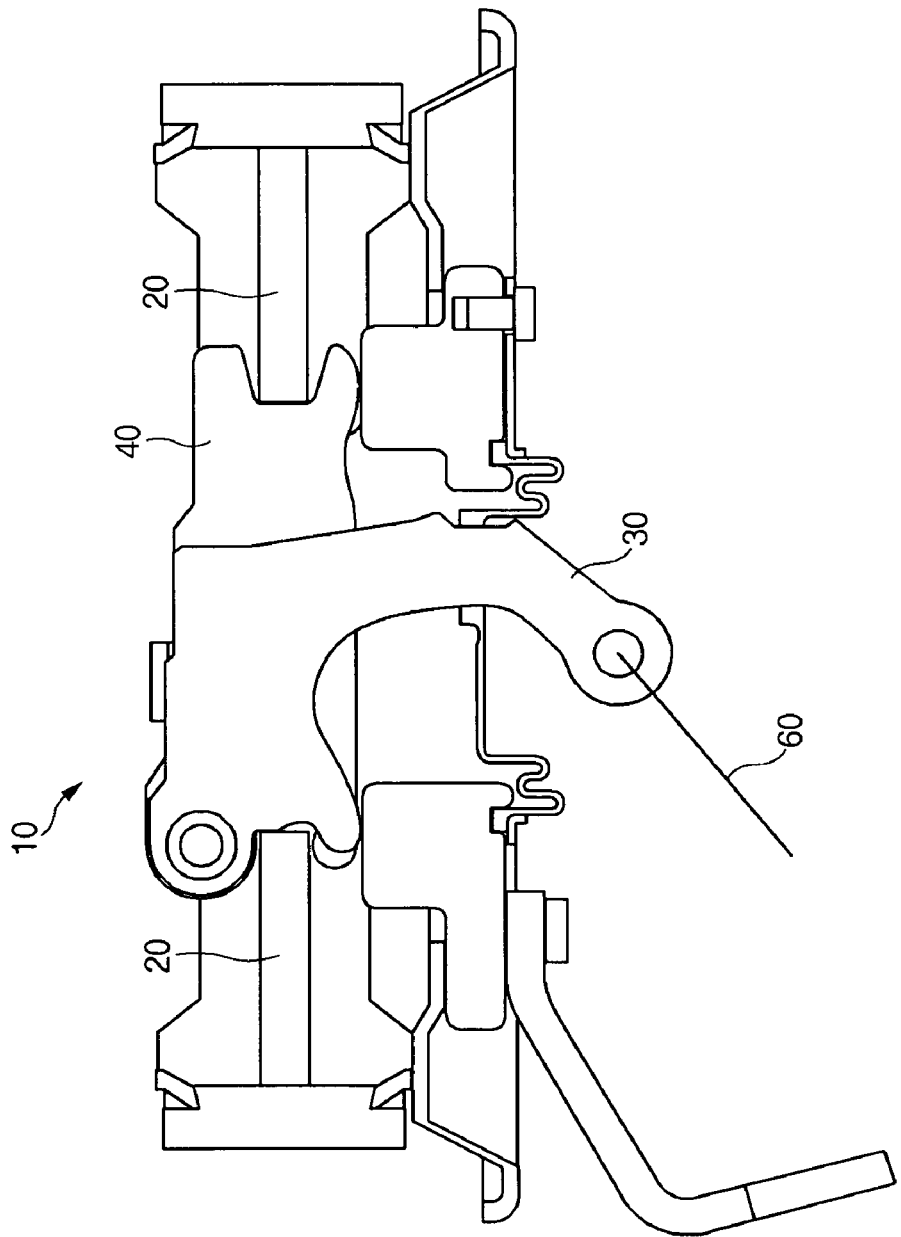
FIG. 5 is a cross-sectional view of a conventional apparatus for operating a parking brake.

Referring to FIG. 4, the total distance $l_{tot}$ by which the apparatus for operating a parking brake according to an exemplary embodiment of the present invention moves the brake shoe.

The total distance $l_{tot}$ by which the apparatus for operating a parking brake is a sum of a distance $l_1$ by which the first operation lever moves the brake shoe and a distance $l_2$ by which the second operation lever moves the brake shoe.

If d denotes a distance from the hinge axis of the first operation lever to a position where the first operation lever and the brake shoe are contacted, and c denotes a distance from the hinge axis of the first operation lever to a position where the brake cable is connected with the first operation lever, then a distance $l_1$ by which the first operation lever moves the brake shoe can be calculated by an equation $$l_1 = \frac{d}{c} \times l.$$

Here, l denotes a distance by which the first operation lever is moved.

Distances $r_1$, $r_2$ by which contacting points of the first operation lever and the second operation lever are moved are calculated by an equation $$r_1 = r_2 = \frac{\beta}{360°} \times 2\pi b = \frac{\alpha}{360°} \times 2\pi a.$$

Here, a denotes a rotation radius of the first operation lever, b denotes a rotation radius of the second operation lever, α denotes an angle by which the first operation lever is rotated, and β denotes an angle by which the second operation lever is rotated.

Accordingly, the angle β by which the second operation lever is rotated is calculated from an equation $$\beta = \frac{r_2}{2\pi b} \times 360°,$$

and the distance $r_1$ by which the contacting point of the first operation lever and the second operation lever is calculated from an equation $$r_1 = \frac{\alpha}{360°} \times 2\pi a = \frac{l}{c} \times a.$$

A distance $l_2$ by which the second operation lever moves the brake shoe can be calculated by an equation $$l_2 = \frac{\beta}{360°} \times 2\pi e \frac{\frac{r_2}{2\pi b} \times 360°}{360°} \times 2\pi e = \frac{r_2}{b} \times e = \frac{r_1}{b} \times e = \frac{1}{b} \times \frac{l}{c} a \times e = \frac{ae}{bc} \times l.$$

Here, e denotes a distance from the hinge axis of the second operation lever to a position where the second operation lever and the brake shoe are contacted.

Consequently, the total distance $l_{tot}$ by which the apparatus for operating a parking brake moves the brake shoe is calculated from an equation $$l_{tot} = l_1 + l_2 = \frac{d}{c} \times l + \frac{ae}{bc} \times l = \frac{1}{bc}(bd + ae) \times l.$$

Therefore, even if an operation stroke l that is a distance by which the brake cable moves the first operation lever is same, the apparatus for operating a parking brake moves the brake more by $l_2$.

According to an exemplary embodiment of the present invention, the operation stroke can be reduced without reducing the distance by which the apparatus for operating a parking brake moves the brake shoe. Furthermore, a conventional apparatus for operating a parking brake can be utilized, and thus the cost thereof can be reduced and the installation thereof can be simplified.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for operating a parking brake by pushing brake, comprising:
   a connecting member with shoe insert grooves configured for receiving brake shoes;
   a first operation lever having one end rotatably combined with the connecting member and disposed to contact a brake shoe when received in one said groove; and
   a second operation lever having one end combined with the other end of the first operation lever and the other end rotatably combined with the connecting member and disposed to contact another brake shoe when received in the other said groove.

2. The apparatus of claim 1, wherein the other end of the first operation lever and the one end of the second operation lever are respectively provided with gear teeth and engaged with each other.

3. The apparatus of claim 1, wherein a brake cable is connected with the first operation lever.

4. The apparatus of claim 3, wherein a rotation radius of the first operation lever is larger than a rotation radius of the second operation lever.

5. The apparatus of claim 1, further comprising a brake shoe disposed in each said insert groove with the first operation level contacting a first brake shoe and a second operation level contacting a second shoe.

* * * * *